(12) United States Patent
Kirchmair et al.

(10) Patent No.: US 10,144,462 B2
(45) Date of Patent: Dec. 4, 2018

(54) CRAWLER VEHICLE DRIVE SYSTEM AND CRAWLER VEHICLE COMPRISING SUCH A DRIVE SYSTEM

(71) Applicant: PRINOTH S.p.A., Vipiteno (IT)

(72) Inventors: Martin Kirchmair, Pfons (AT); Gregor Maurer, Vipiteno (IT); Martin Runggaldier, St. Christina (IT)

(73) Assignee: PRINOTH S.p.A., Vipiteno (IT)

( * ) Notice: Subject to any disclaimer, the term of this patent is extended or adjusted under 35 U.S.C. 154(b) by 0 days.

(21) Appl. No.: 15/123,127

(22) PCT Filed: Mar. 4, 2015

(86) PCT No.: PCT/IB2015/051584
§ 371 (c)(1),
(2) Date: Sep. 1, 2016

(87) PCT Pub. No.: WO2015/132741
PCT Pub. Date: Sep. 11, 2015

(65) Prior Publication Data
US 2017/0113743 A1   Apr. 27, 2017

(30) Foreign Application Priority Data

Mar. 4, 2014 (IT) .............................. MI2004A0334

(51) Int. Cl.
*B62D 55/06* (2006.01)
*B62D 55/112* (2006.01)
(Continued)

(52) U.S. Cl.
CPC ........... *B62D 55/244* (2013.01); *B62D 55/06* (2013.01); *B62D 55/112* (2013.01); *B62D 55/12* (2013.01);
(Continued)

(58) Field of Classification Search
CPC ...... B62D 55/06; B62D 55/112; B62D 55/12; B62D 55/14; B62D 55/244; B62D 55/26; B62D 55/305; E01H 4/02
See application file for complete search history.

(56) References Cited

U.S. PATENT DOCUMENTS 2,453,209 A * 11/1948 Dwight ................ B62D 55/253
  305/181
3,250,577 A * 5/1966 Olson .................... B62D 55/07
  180/190
(Continued)

FOREIGN PATENT DOCUMENTS

CA    2 430 028     11/2004
DE      10320523    11/2004
(Continued)

OTHER PUBLICATIONS

Notification of the Recording of a Change for International Application No. PCT/IB2015/051584 dated Mar. 4, 2015.
(Continued)

*Primary Examiner* — Joseph M Rocca
*Assistant Examiner* — Maurice L Williams
(74) *Attorney, Agent, or Firm* — Neal, Gerber & Eisenberg LLP

(57) ABSTRACT

A crawler vehicle drive system, in particular for a crawler vehicle configured to groom ski slopes, having: a drive wheel rotating about a first rotation axis; an idle wheel rotating about a second rotation axis parallel to the first rotation axis); and a track looped around the drive wheel and the idle wheel, and comprising a plurality of belts made of an elastomeric material and a plurality of metal grousers fixed to the belt; wherein at least one belt has at least one continuous toothed strip extending along the inner face of the belt and configured to mesh with the drive wheel.

23 Claims, 3 Drawing Sheets

(51) Int. Cl.
  *B62D 55/12* (2006.01)
  *B62D 55/14* (2006.01)
  *B62D 55/24* (2006.01)
  *B62D 55/26* (2006.01)
  *B62D 55/27* (2006.01)
  *B62D 55/30* (2006.01)
  *E01H 4/02* (2006.01)

(52) U.S. Cl.
  CPC .............. *B62D 55/14* (2013.01); *B62D 55/26* (2013.01); *B62D 55/27* (2013.01); *B62D 55/305* (2013.01); *E01H 4/02* (2013.01); *B60Y 2200/25* (2013.01); *B60Y 2200/41* (2013.01); *B60Y 2400/48* (2013.01)

(56) References Cited

U.S. PATENT DOCUMENTS

| | | | | |
|---|---|---|---|---|
| 3,390,924 | A | * | 7/1968 | Bumbaugh ............ B62D 55/24 305/181 |
| 3,558,198 | A | * | 1/1971 | Tomita ................. B62D 55/286 305/180 |
| 3,610,708 | A | * | 10/1971 | Muecke ............... B62D 55/202 305/181 |
| 3,622,209 | A | * | 11/1971 | Leyden ................ B62D 55/244 198/847 |
| 3,703,321 | A | * | 11/1972 | Schoonover ........... B62D 55/24 305/166 |
| 3,721,477 | A | | 3/1973 | Cooper et al. |
| 3,722,961 | A | | 3/1973 | Haley et al. |
| 3,738,714 | A | * | 6/1973 | Ness ..................... B62D 55/07 180/193 |
| 3,754,798 | A | | 8/1973 | Chaumont |
| 3,756,668 | A | | 9/1973 | Russ, Sr. |
| 3,773,394 | A | * | 11/1973 | Grawey ................. B60B 15/04 152/185.1 |
| 3,853,359 | A | * | 12/1974 | Pusch .................... B62D 55/24 305/181 |
| 3,888,132 | A | * | 6/1975 | Russ, Sr. .................. F16G 1/28 305/169 |
| 3,930,689 | A | * | 1/1976 | Maki ...................... B62D 55/07 180/190 |
| 3,944,006 | A | * | 3/1976 | Lassanske ............ B62D 55/202 180/9.62 |
| 3,948,110 | A | * | 4/1976 | Lassanske ............. B62D 55/12 305/178 |
| 4,194,583 | A | * | 3/1980 | Aaen ...................... B62D 55/24 180/190 |
| 4,241,956 | A | * | 12/1980 | Meisel, Jr. ........... B62D 55/0963 305/109 |
| 4,278,302 | A | * | 7/1981 | Westimayer ........... B62D 55/07 305/120 |
| 4,678,244 | A | * | 7/1987 | Furuta ................... B62D 55/12 305/175 |
| 4,844,562 | A | * | 7/1989 | Ranner ................ B62D 55/253 305/167 |
| 4,938,546 | A | * | 7/1990 | Simmons ............... B62D 55/24 305/165 |
| 5,174,638 | A | * | 12/1992 | Tokue ..................... B62D 55/07 305/166 |
| 5,354,124 | A | | 10/1994 | James |
| 5,368,376 | A | * | 11/1994 | Edwards ................. B62D 55/24 305/167 |
| 5,409,305 | A | * | 4/1995 | Nagorcka .............. B62D 55/084 180/9.52 |
| 5,447,365 | A | * | 9/1995 | Muramatsu ........ C09K 19/3466 305/167 |
| 5,533,796 | A | | 7/1996 | Beeley |
| 5,639,148 | A | * | 6/1997 | Sheidler ............... B62D 55/084 305/116 |
| 5,899,164 | A | | 5/1999 | Coast |
| 6,186,604 | B1 | * | 2/2001 | Fikse .................... B62D 55/215 305/160 |
| 6,264,294 | B1 | | 7/2001 | Musselman et al. |
| 6,474,755 | B1 | * | 11/2002 | Pringiers ............. B62D 55/253 305/170 |
| 8,002,365 | B2 | * | 8/2011 | Jacobsen ............ B62D 55/0655 180/9.44 |
| 8,936,324 | B2 | * | 1/2015 | Paquet ................. B62D 55/202 305/174 |
| 2003/0006645 | A1 | * | 1/2003 | Ueno ................. B62D 55/0885 305/165 |
| 2004/0150263 | A1 | * | 8/2004 | Katoh .................. B62D 55/253 305/171 |
| 2005/0248214 | A1 | * | 11/2005 | Sugihara ................ B62D 55/08 305/116 |
| 2007/0052292 | A1 | | 3/2007 | Musselman |
| 2007/0063584 | A1 | * | 3/2007 | St-Pierre ................ B62D 55/26 305/169 |
| 2008/0309157 | A1 | * | 12/2008 | Runggaldier .......... B62D 55/26 305/47 |
| 2009/0195061 | A1 | | 8/2009 | Bellemare |
| 2010/0244554 | A1 | * | 9/2010 | Yoshida ................ B62D 55/104 305/132 |
| 2011/0316330 | A1 | * | 12/2011 | Doyle .................. B62D 55/244 305/165 |
| 2012/0193979 | A1 | * | 8/2012 | Pard ..................... B62D 55/125 305/178 |
| 2013/0147262 | A1 | | 6/2013 | Paquet |
| 2015/0008728 | A1 | * | 1/2015 | Davis .................... B62D 55/112 305/131 |
| 2015/0076898 | A1 | * | 3/2015 | Eavenson, Sr. ....... B62D 55/125 305/199 |
| 2015/0166133 | A1 | * | 6/2015 | Eavenson, Sr. ....... B62D 55/108 305/134 |
| 2016/0362150 | A1 | * | 12/2016 | Kirchmair ............ B62D 55/104 |

FOREIGN PATENT DOCUMENTS

| | | |
|---|---|---|
| EP | 1 279 482 | 1/2003 |
| EP | 2 285 651 | 2/2011 |
| GB | 2 304 395 | 3/1997 |
| IT | 1234428 | 5/1992 |
| JP | S6157474 | 3/1986 |
| JP | H02286476 | 11/1990 |
| WO | WO 2014/008370 | 1/2014 |

OTHER PUBLICATIONS

Letter to International Bureau of WIPO dated Aug. 31, 2016 for International Application No. PCT/IB2015/051584.
Notification Concerning Submission, Obtention or Transmittal of Priority Document for International Application No. PCT/IB2015/051584 dated Jun. 26, 2015.
International Search Report and Written Opinion for International Application No. PCT/IB2015/051584 dated May 27, 2015.
PCT Demand for International Preliminary Examination and Reply to International Search Report and the associated Written Opinion for International Application No. PCT/IB2015/051584 dated Dec. 29, 2015.
Notification of Receipt of Demand by Competent International Preliminary Examining Authority (Form PCT/IPEA/402) for International Application No. PCT/IB2015/051584 dated Jan. 22, 2016.
Second Written Opinion of the International Preliminary Examining Authority for International Application No. PCT/IB2015/051584 dated Feb. 5, 2016.
Reply to the Second Written Opinion of the International Searching Authority for International Application No. PCT/IB2015/051584 dated Apr. 5, 2016.
Notification of Transmittal of the International Preliminary Report on Patentability (Form PCT/IPEA/416) for International Application No. International Application No. PCT/IB2015/051584 dated Jul. 1, 2016.
Chinese Office Action from Chinese Application No. 201580023240.6, dated Jul. 24, 2018 (7 pages).

* cited by examiner

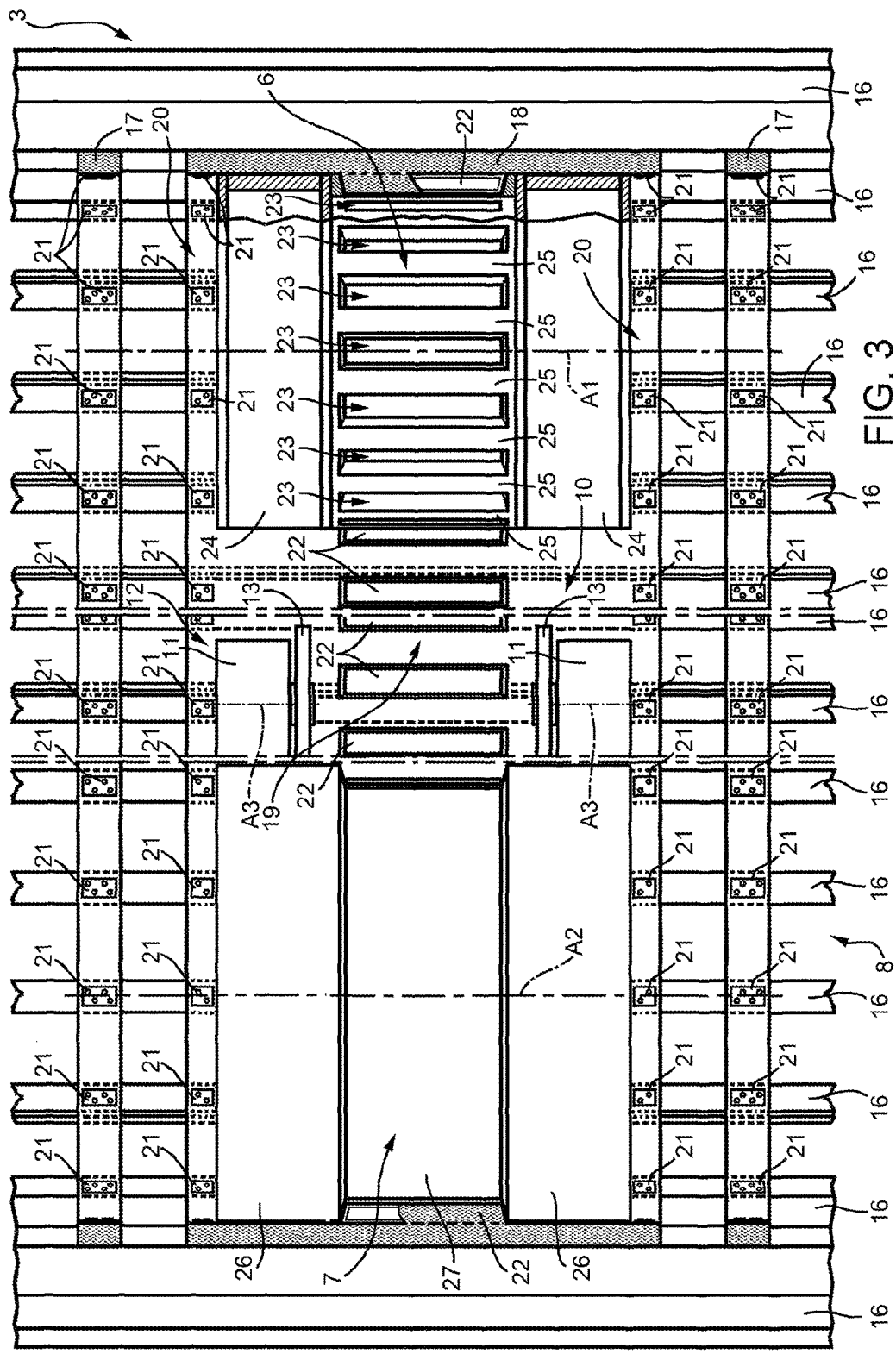

CRAWLER VEHICLE DRIVE SYSTEM AND CRAWLER VEHICLE COMPRISING SUCH A DRIVE SYSTEM

PRIORITY CLAIM

This application is a national stage application of PCT/IB2015/051584, filed on Mar. 4, 2015, which claims the benefit of and priority to Italian Patent Application No. MI2004A000334, filed on Mar. 4, 2014, the entire contents of which are each incorporated by reference herein.

BACKGROUND

In general, a known drive system for a crawler vehicle, such as a crawler vehicle configured to groom ski slopes, comprises a drive wheel rotating about a first rotation axis; an idle wheel rotating about a second rotation axis parallel to the rotation axis; and a track, which is looped around the drive wheel and the idle wheel. The track comprises a plurality of belts made of an elastomeric material, and a plurality of transverse metal elements, fastened to the belts and uniformly distributed along the track. The drive wheel has sprockets and is configured to mesh with the transverse elements. A drive system of the above-indicated type is described in German Patent Application No. 103 20 523 A1.

According to an alternative form described in EP Patent Application No. 2,285,651, the drive system comprises a chain connected to the transverse elements and the drive wheel is configured to mesh with the chain.

According to another alternative form described in U.S. Pat. No. 5,899,164, the belt is clamped between grousers and teeth bolted to grouser and engage by a drive wheel.

Drive systems for crawler vehicles of the above-indicated type provide a relatively secure, slip-free grip between drive wheel and track, but, especially at relatively high speeds, generate vibrations that impair comfort and accelerate wear on the drive system.

SUMMARY

The present disclosure relates to a drive system for a crawler vehicle, in particular for a crawler vehicle configured to groom ski slopes.

The advantage of the present disclosure is to provide a drive system for a crawler vehicle that does not have certain of the drawbacks of certain of the known art.

According to the present disclosure, a drive system is provided for a crawler vehicle, in particular for a crawler vehicle configured to groom ski slopes, the drive system comprising:
a drive wheel rotating about a first rotation axis;
an idle wheel rotating about a second rotation axis parallel to the first rotation axis;
a track, which is looped around the drive wheel and the idle wheel, and comprises a first belt and a plurality of second belts located on opposite sides of first belt, the first and the second belt being made of an elastomeric material and a plurality of metal grousers fastened to the first and second belts by plates bolted onto the grousers to sandwich part of the first and second belts between the plates and the grousers; wherein the first belt has at least one continuous toothed strip that extends along the inner face of the first belt and is configured to mesh with the drive wheel, and at least one continuous smooth strip located along the inner face of the first belt; wherein the drive wheel and the idle wheel are in contact with the first belt along the continuous smooth strip.

Such a configuration provides that direct contact between rigid parts, such as the drive wheel and the grousers for example, does not take place. Instead, the mechanical contact for transmitting tractive force to the track takes place between the first belt made of an elastomeric material and the drive wheel. In consequence, the continuous toothed strip absorbs and cushions possible shocks generated in transmitting drive from the drive wheel to the grousers and possible shocks transmitted from the grousers to the wheel.

In different embodiments, the continuous smooth strip defines the guide area of the first belt and the track. In this way, the drive wheel is able to guide the first belt and the track at the drive wheel without causing shock.

Advantageously, the first belt and the track are also guided at the idle wheel without causing shock.

In particular, the first belt has a plurality of uniformly distributed teeth along the continuous toothed strip and the drive wheel has openings, each of which is configured to accommodate a respective tooth. In this way, the drive wheel meshes with the first belt. In certain embodiments, the tooth is arranged in contact with the drive wheel along its sides.

In particular, the drive wheel comprises two tubular members spaced apart from each other along the first rotation axis and located on opposite sides of the continuous toothed strip; and bars parallel to the first rotation axis to connect the tubular members and so define said openings.

Transmission of drive effectively takes place between the sides of the teeth and the bars.

In accordance with one embodiment of the present disclosure, the idle wheel comprises two further tubular members spaced along the second rotation axis and configured to be positioned in contact with the first belt along two respective continuous smooth strips located on opposite sides of the continuous toothed strip. This symmetrical configuration enables a relatively precise and secure guide to be defined for the first belt and the track.

In particular, the drive system comprises at least one support device configured to discharge part of the mass of the crawler vehicle to the ground through the track and positioned in contact with the first belt along the continuous smooth strip.

The mass of the vehicle is discharged onto the first belt, which cushions possible shocks caused by the grousers passing under the support device.

In accordance with one embodiment of the disclosure, the support device comprises a plurality of rollers and a structure configured to support the rollers and push them against said first belt.

In accordance with one embodiment of the present disclosure, the rollers are arranged in two parallel rows and each have a third rotation axis parallel to the first rotation axis, each row of rollers being configured to make contact with the first belt along a respective continuous strip. This configuration enables good distribution of the vehicle's mass on the track, or rather along a portion thereof.

A further advantage of the present disclosure is to provide a crawler vehicle that does not have certain of the drawbacks of certain of the known art.

In accordance with the present disclosure, a crawler vehicle is provided, in particular configured to groom ski slopes, the crawler vehicle comprising at least two drive systems as described herein.

Additional features and advantages are described in, and will be apparent from the following Detailed Description and the figures.

BRIEF DESCRIPTION OF THE DRAWINGS

Other characteristic and advantages of the present disclosure will become clear from the description that follows and its non-limitative examples of embodiment, with reference to the accompanying figures, where:

FIG. 3 is a plan view, on an enlarged scale with parts removed for clarity, of the drive system in FIG. 1.

DETAILED DESCRIPTION

Figure 1:
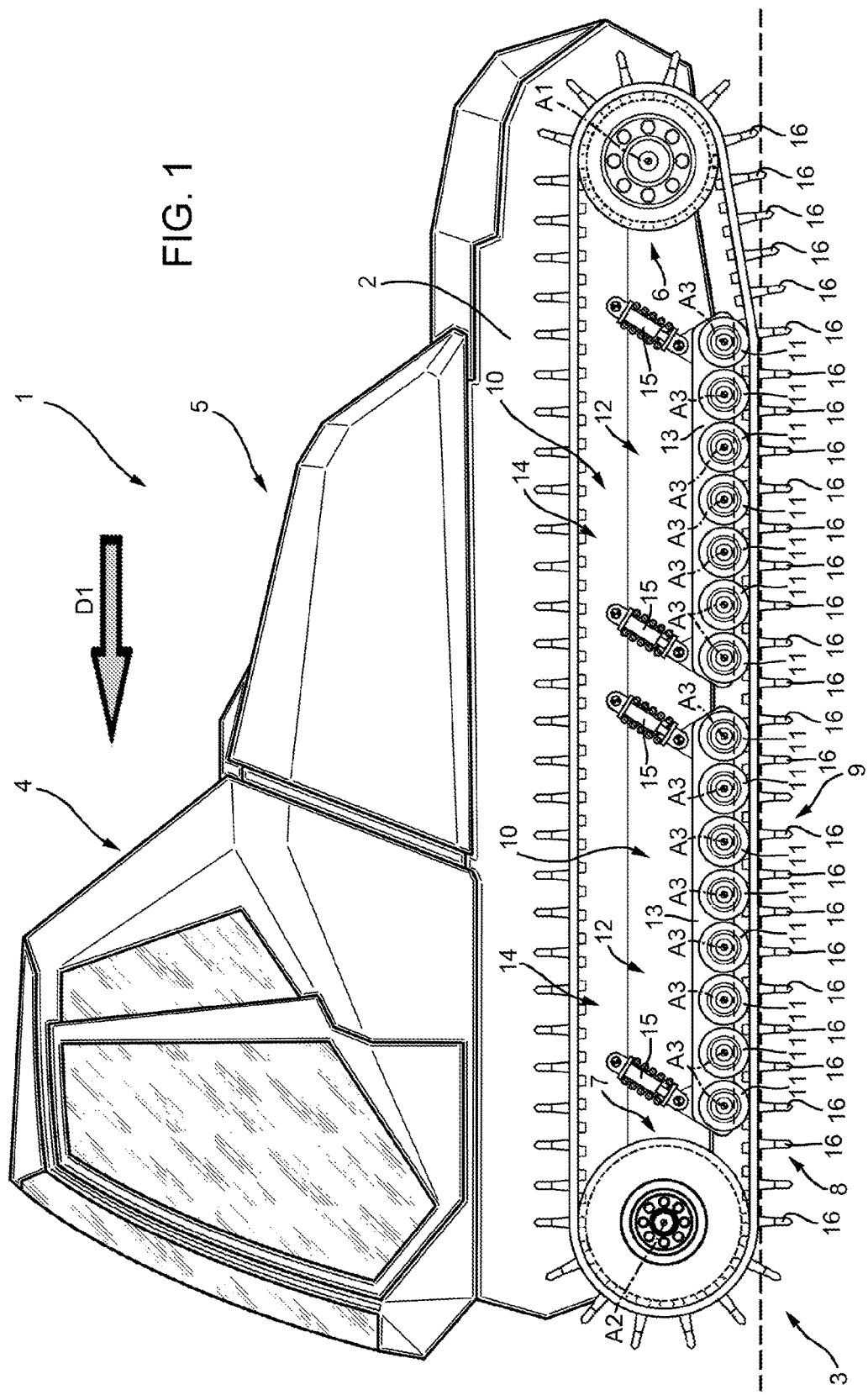
FIG. 1 is a side elevation view, with parts removed for clarity, of a crawler vehicle equipped with a drive system made according to the present disclosure.
Figure 2:
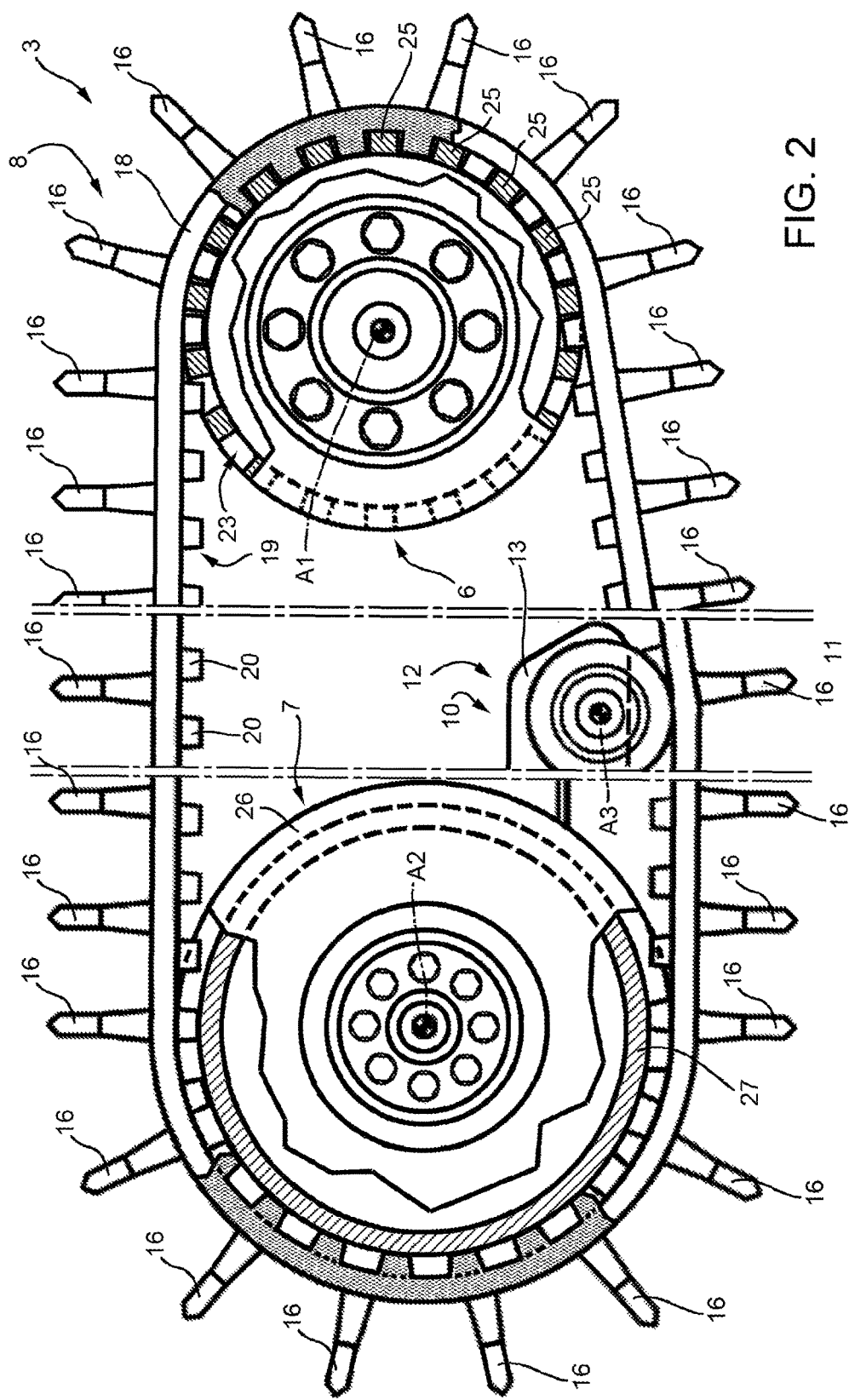
FIG. 2 is a side elevation view, on an enlarged scale with parts removed for clarity and parts in section, of a detail of FIG. 1.

Referring now to the example embodiments of the present disclosure illustrated in FIGS. 1 to 3, with reference to FIG. 1, reference numeral 1 indicates, as a whole, a crawler vehicle configured to groom ski slopes and configured to move in a forwards direction D1. The crawler vehicle 1 comprises a frame 2; two drive systems 3 (only one shown in FIG. 1); a cabin 4; and an engine 5. Each drive system 3 comprises a drive wheel 6; an idle wheel 7; and a track 8 looped around the drive wheel 6 and the idle wheel 7.

Each drive wheel 6 corresponds to the rear wheel of the crawler vehicle 1, rotates about a rotation axis A1 and is driven by an actuator, such as a hydraulic or electric actuator (not shown in the accompanying figures).

Each idle wheel 7 corresponds to the front wheel of the crawler vehicle 1, rotates about a rotation axis A2 parallel to rotation axis A1, and is supported by the frame 2 in a selectively movable manner in both directions parallel to the forward direction D1 to provide opportune tensioning of the track 8 under all operating conditions.

The track 8 comprises an upper section and a lower section along which a traction portion 9 extends. In use, the traction portion is in contact with the ground to discharge the mass of the crawler vehicle 1 and the tractive force, transmitted by the engine 5 through a kinematic chain to the drive wheels 6.

Each drive system 3 comprises at least one support device 10, which has the function of discharging part of the mass of the crawler vehicle 1 on the respective track 8 and compressing the traction portion 9 against the ground. In the case shown, each drive system 3 comprises two support devices 10 aligned with each other in direction D1 and located between the drive wheel 6 and the idle wheel 7.

Each support device 10 comprises a plurality of rollers 11 with a diameter significantly smaller than the diameter of the drive wheel 6; and a structure 12 configured to support the rollers 11 and to push the rollers 11 against the inner part of the track 8 and along the traction portion 9 of the track 8.

The rollers 11 each have a rotation axis A3 parallel to the rotation axis A1 of the drive wheel 6. Each roller 11 is mounted on the structure 12.

In accordance with one variant, each roller 11 is mounted on the structure 12 in an elastically yielding manner to enable the roller 11 to move in directions perpendicular to its rotation axis A3.

The structure 12 comprises at least one beam 13 configured to support the rollers 11 and an articulated mechanism 14 configured to connect the beam 13 to the frame 2 of the crawler vehicle 1.

The articulated mechanism 14 comprises an articulated quadrilateral formed by the beam 13, the frame 2 and by at least two arms 15, hinged to the beam 13 and the frame 2.

The structure 12 comprises at least one actuator to adjust the position of the rollers 11 with respect to the frame 2. In particular, in the case shown, the arms 15 are defined by linear hydraulic actuators.

With reference to FIG. 3, each track 8 comprises a plurality of grousers 16 and belts 17 and 18, which are made of an elastomeric material, form a closed loop and support the grousers 16.

Belt 18 is configured to cooperate with the drive wheel 6, the idle wheel 7 and the support devices 10. In the case in point, belt 18 is located in a central position and has an inner face with a continuous toothed strip 19 and two continuous smooth strips 20 located on opposite sides of the continuous toothed strip 19.

Belts 17 located on opposite sides of belt 18 only have the function of connecting the grousers 16 between them. The number or quantity of belts 17 depends on the length of the grousers 16.

Each grouser 16 is connected to belts 17 and 18 by plates 21 bolted onto the grousers 16. In practice, the plates 21 are fixed to the grousers 16 to sandwich part of belts 17 and belt 18 between the plates 21 and the grousers 16.

Belt 18 has a series of teeth 22 uniformly distributed along the continuous toothed strip 19 in the forward direction D1. In the case in point, the teeth 22 are parallelepipedal.

Each drive wheel 6 has openings 23, each of which is configured to accommodate a respective tooth 22. In the case shown, each drive wheel 6 comprises two tubular members 24 spaced along rotation axis A1 and bars 25, parallel to rotation axis A1 and joined by the tubular members 24 at their opposite ends. In this way, the tubular members 24 and the bars 25 define the openings 23, which are shaped like windows, while the bars 25 transmit the tractive force to the sides of the teeth 22 (FIG. 2).

The support device 10 has two parallel rows of rollers 11 positioned on the continuous smooth strips 20 such that the rollers 11 are placed in contact with belt 18 along the continuous smooth strips 20.

With reference to FIG. 2, the idle wheel 7 is placed in contact with belt 18 along the continuous smooth strips 20.

With reference to FIG. 3, the idle wheel 7 comprises two tubular members 26 axially spaced apart from each other and configured to be placed in contact with the continuous smooth strips 20. In particular, the two tubular members 26 are connected to each other by a further tubular member 27 having a diameter smaller than the diameter of tubular members 26 and, in any case, such that the connection does not interfere with the teeth 22.

In use, and with reference to FIG. 1, the support devices 10 distribute the mass of the crawler vehicle 1 along the traction portions 9 of the tracks 8 and cushion shocks utilizing the articulated mechanisms 14.

With reference to FIG. 3, the rollers 11 of the support devices 10 are placed in contact with belt 18 along the continuous smooth strips 20 of the belt 18.

Motion of the crawler vehicle 1 is caused by the meshing between the drive wheels 6 and belt 18. In particular, the drive wheel 6 meshes with belt 18 along the continuous toothed strip 19. The teeth 22, like belt 18, are made of an elastomeric material and are therefore ideal for minimizing shocks.

The drive wheel 6 and the idle wheel 7 are placed in contact with the continuous smooth strips 20 along respective tubular portions 24 and 26.

The scope of the present disclosure is defined by the claims, which cover variants that are not explicitly described and equivalent embodiments. For example, the rollers could also be relatively large ones because they act on a belt made of an elastomeric material and are not directly in contact with the grousers. In the example described, two continuous smooth strips located on opposite sides of a toothed strip are provided, although the present disclosure may naturally include different variants such as, for example, the use of a belt with only one continuous smooth strip and only one toothed strip or a belt with only one continuous smooth strip and two continuous toothed strips configured to mesh with the drive wheel. As such, changes may be made to the embodiments of the present disclosure described with reference to the attached drawings without, however, departing from the protective scope of the accompanying Claims. Accordingly, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A crawler vehicle drive system comprising:
   a drive wheel configured to rotate about a first rotation axis;
   an idle wheel configured to rotate about a second rotation axis parallel to the first rotation axis; and
   a track looped around the drive wheel and the idle wheel, said track including:
      a first belt made of an elastomeric material and having:
         at least one continuous toothed strip extending along an inner face of the first belt and configured to mesh with the drive wheel, and
         at least one continuous smooth strip located along the inner face of the first belt and configured to contact the drive wheel and the idle wheel,
      a plurality of second belts located on opposite sides of first belt, each of the second belts being made of the elastomeric material, and
      a plurality of metal grousers fixed to the first belt and the plurality of second belts by a plurality of plates, wherein none of the metal grousers contact the drive wheel or the idle wheel, each of the plates is attached to one of the metal grousers to sandwich part of the first belt or part of one of the second belts between said plate and said metal grouser, and for each of the plates, said plate is attached to one of the metal grousers at a location spaced away from the drive wheel and the idle wheel such that none of the plates contact the drive wheel or the idle wheel.

2. The crawler vehicle drive system of claim 1, wherein:
   the first belt defines a plurality of equally spaced teeth along the at least one continuous toothed strip, and
   the drive wheel defines a plurality of openings each configured to receive a respective tooth of the first belt.

3. The crawler vehicle drive system of claim 2, wherein the drive wheel includes:
   two tubular members spaced apart along the first rotation axis and located on opposite sides of the at least one continuous toothed strip, and
   a plurality of bars parallel to the first rotation axis and configured to connect the tubular members to define said openings.

4. The crawler vehicle drive system of claim 1, wherein the idle wheel includes two tubular members spaced along the second rotation axis and configured to make contact with the first belt along two respective continuous smooth strips located on opposite sides of the continuous toothed strip.

5. The crawler vehicle drive system of claim 1, which includes at least one supporting device positioned in contact with the first belt along the at least one continuous smooth strip and configured to discharge part of a mass of a crawler vehicle to a ground via the track.

6. The crawler vehicle drive system of claim 5, wherein the supporting device includes:
   a plurality of rollers, and
   a structure configured to support the plurality of rollers and push the rollers against said first belt.

7. The crawler vehicle drive system of claim 6, wherein the rollers are arranged in two parallel rows, and each roller has a third rotation axis parallel to the first rotation axis such that each row of rollers is configured to make contact with the first belt along a respective one of the at least one continuous smooth strip.

8. The crawler vehicle drive system of claim 6, wherein the structure includes an articulated mechanism configured to adjust a position of the rollers with respect to the drive wheel.

9. The crawler vehicle drive system of claim 8, wherein the articulated mechanism includes at least one actuator configured to adjust the position of the rollers with respect to the drive wheel.

10. The crawler vehicle drive system of claim 9, wherein the actuator includes a hydraulic actuator.

11. The crawler vehicle drive system of claim 1, wherein each of the plates is bolted onto one of the metal grousers.

12. A crawler vehicle comprising:
    at least two drive systems, each drive system including:
    a drive wheel configured to rotate about a first rotation axis;
    an idle wheel configured to rotate about a second rotation axis parallel to the first rotation axis; and
    a track looped around the drive wheel and the idle wheel, said track including:
       a first belt made of an elastomeric material and having:
          at least one continuous toothed strip extending along an inner face of the first belt and configured to mesh with the drive wheel, and
          at least one continuous smooth strip located along the inner face of the first belt and configured to contact the drive wheel and the idle wheel,
       a plurality of second belts located on opposite sides of first belt, each of the second belts being made of the elastomeric material, and
       a plurality of metal grousers fixed to the first belt and the plurality of second belts by a plurality of plates, wherein none of the metal grousers contact the drive wheel or the idle wheel, each of the plates is attached to one of the metal grousers to sandwich part of the first belt or part of one of the second belts between said plate and said metal grouser, and for each of the plates, said plate is attached to one of the metal grousers at a location spaced away from the drive wheel and the idle wheel such that none of the plates contact the drive wheel or the idle wheel.

13. The crawler vehicle of claim 12, which is configured to groom ski slopes.

14. The crawler vehicle of claim 12, wherein for each drive system:
the first belt defines a plurality of equally spaced teeth along the at least one continuous toothed strip, and
the drive wheel defines a plurality of openings each configured to receive a respective tooth of the first belt.

15. The crawler vehicle of claim 14, wherein for each drive system, the drive wheel includes:
two tubular members spaced apart along the first rotation axis and located on opposite sides of the at least one continuous toothed strip, and
a plurality of bars parallel to the first rotation axis and configured to connect the tubular members to define said openings.

16. The crawler vehicle of claim 12, wherein for each drive system, the idle wheel includes two tubular members spaced along the second rotation axis and configured to make contact with the first belt along two respective continuous smooth strips located on opposite sides of the continuous toothed strip.

17. The crawler vehicle of claim 12, wherein each drive system includes at least one supporting device positioned in contact with the first belt along the at least one continuous smooth strip and configured to discharge part of a mass of a crawler vehicle to a ground via the track.

18. The crawler vehicle of claim 17, wherein the supporting device includes:
a plurality of rollers, and
a structure configured to support the plurality of rollers and push the rollers against said first belt.

19. The crawler vehicle of claim 18, wherein the rollers are arranged in two parallel rows, and each roller has a third rotation axis parallel to the first rotation axis such that each row of rollers is configured to make contact with the first belt along a respective one of the at least one continuous smooth strip.

20. The crawler vehicle of claim 18, wherein the structure includes an articulated mechanism configured to adjust a position of the rollers with respect to the drive wheel.

21. The crawler vehicle of claim 20, wherein the articulated mechanism includes at least one actuator configured to adjust the position of the rollers with respect to the drive wheel.

22. The crawler vehicle of claim 21, wherein the actuator includes a hydraulic actuator.

23. The crawler vehicle of claim 12, wherein for each drive system, each of the plates is bolted onto one of the metal grousers.

* * * * *